Aug. 14, 1923.

P. SCHULTZE

TIRE RIM

Original Filed Sept. 13, 1920    2 Sheets-Sheet 1

1,465,096

Paul Schultze, Inventor

By Lancaster and Allwine
Attorney

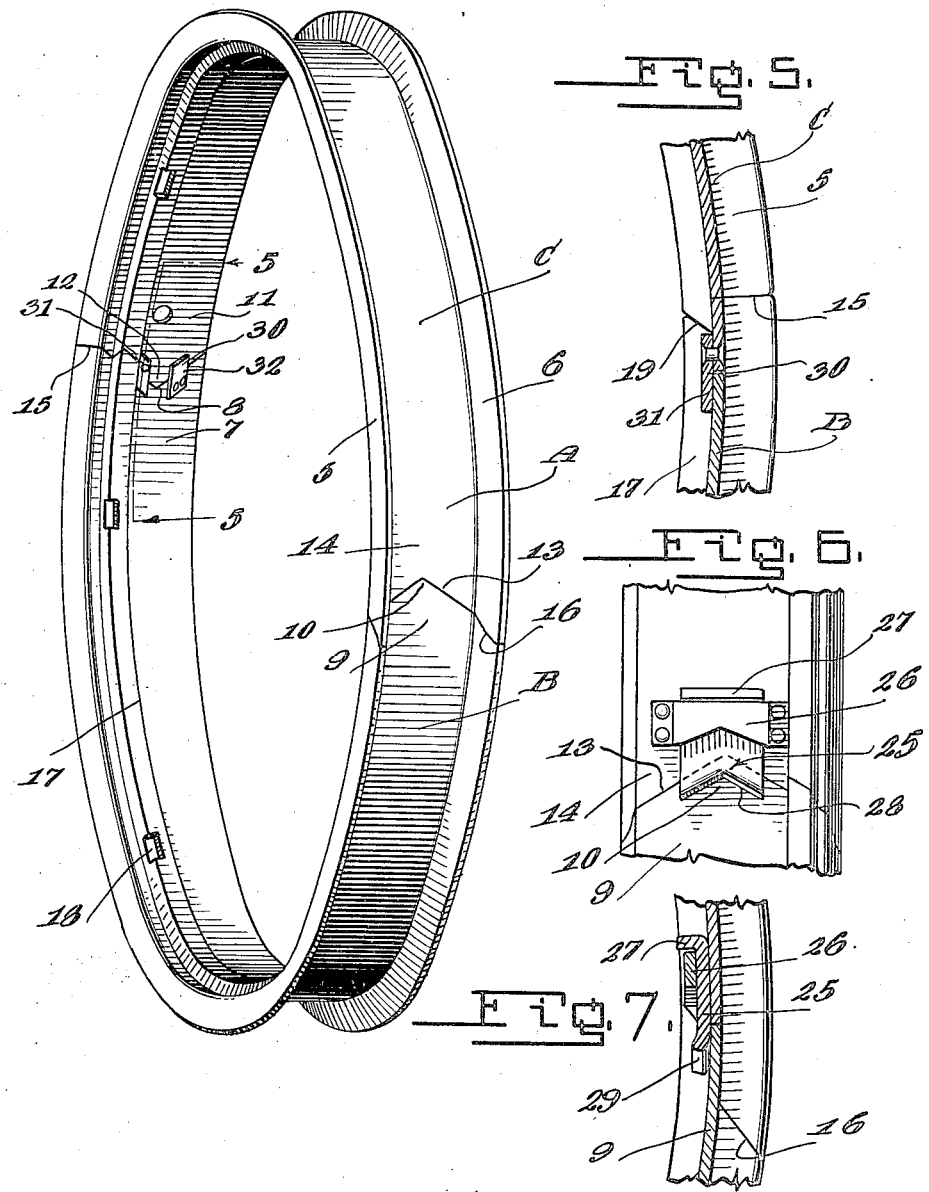

Patented Aug. 14, 1923.

1,465,096

UNITED STATES PATENT OFFICE.

PAUL SCHULTZE, OF WAUCHULA, FLORIDA.

TIRE RIM.

Application filed September 13, 1920, Serial No. 409,779. Renewed September 11, 1922. Serial No. 587,564.

*To all whom it may concern:*

Be it known that I, PAUL SCHULTZE, a citizen of the United States, residing at Wauchula, in the county of De Soto and State of Florida, have invented certain new and useful Improvements in Tire Rims, of which the following is a specification.

This invention relates to tire rims and one of the prime objects of the invention is to provide an improved rim constructed of a pair of arcuate sections whereby a tire can be easily and quickly placed thereon or removed therefrom, said sections also having an improved means for locking the same together to form a single annular body.

Another object of the invention is to provide a tire rim embodying a relatively large section having an arc larger than a semicircle and a second section having an arc slightly less than a semi-circle arranged to fit in between the terminals of the relatively large section, one terminal of the relatively large section having a sliding lock arranged to engage the meeting terminal of the relatively small section, the other meeting terminals of the relatively large and relatively small sections having interfitting locking means whereby the sections may be readily and quickly assembled and dismembered for permitting the convenient placing or removing of a tire from the rim.

A still further object of the invention is to provide an improved tire rim of the above character which is durable and efficient in use, one that is simple and easy to manufacture, and one which can be placed upon the market at a reasonable cost. With these and other objects in view, the invention consists in the novel construction, arrangement and formation of parts as will be hereinafter more specifically described, claimed and illustrated in the accompanying drawings, forming a part of this specification, in which drawings:

Figure 4 is a perspective view of the improved rim showing a modified type of interfitting fastener.

Figure 5 is a fragmentary circumferential view through a portion of the rim and through the modified type of fastener.

Figure 6 is a fragmentary elevation looking into the inner face of the rim illustrating the type of sliding fastener utilized for connecting the other terminals of the sections of the rims together which are remote from the terminals carrying the interfitting fasteners, and Figure 7 is a fragmentary transverse section through the rim illustrating the fasteners.

Referring to the drawings in detail, wherein similar reference characters designate corresponding parts throughout the several views, the letter A indicates the improved rim which includes the relatively large arcuate section B and the relatively small arcuate section C.

Figure 1:
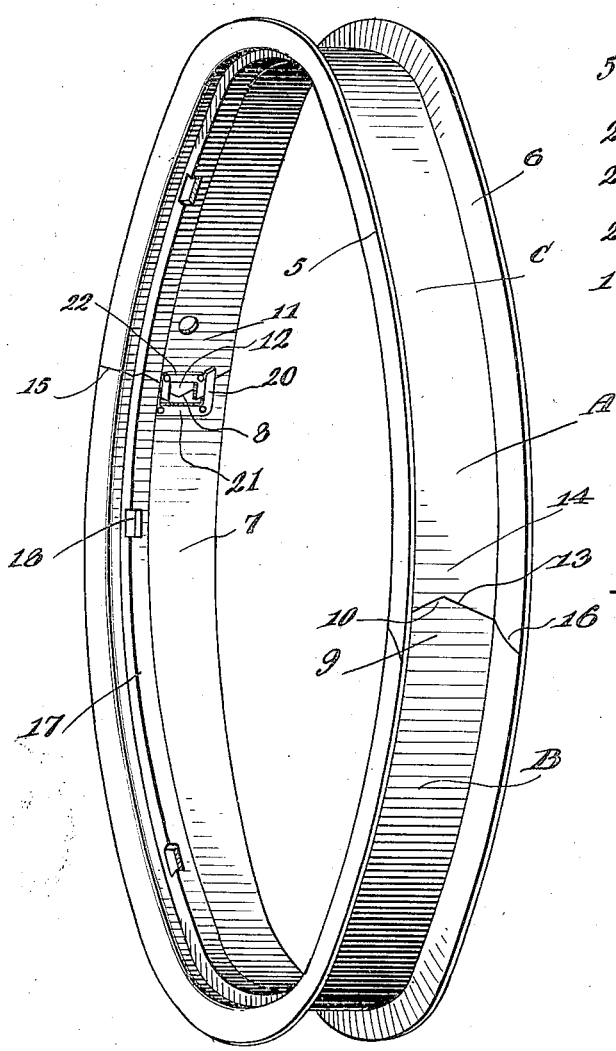
Figure 1 is a perspective view of the improved rim.
Figure 2:
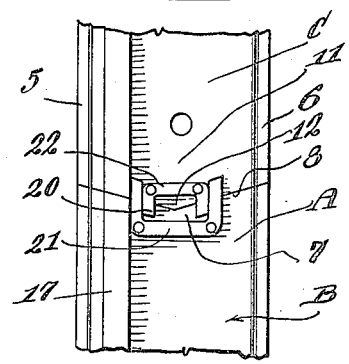
Figure 2 is a fragmentary elevation looking into the rim showing one type of interfitting fastener utilized for fastening the meeting terminals on one side of the rim sections together.
Figure 3:
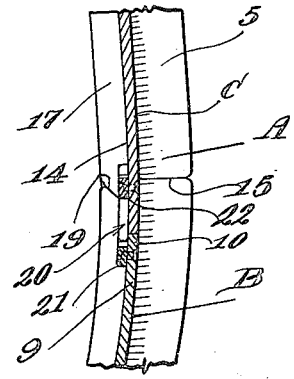
Figure 3 is a fragmentary circumferential section through the rim and interfitting fastener.

The relatively large arcuate section B has an arc slightly larger than a semi-circle, while the section C has an arc slightly less than that of a semi-circle, and the section is adapted to fit between the terminals of the section B so as to form a continuous annular body.

Each of the sections B and C have their opposite edges provided with outwardly extending annular flanges 5 and 6 which form means for retaining a tire in position thereon. It is to be understood that the flanges 5 and 6 may be of the usual straight sided variety or of the clincher bead type according to the type of tire which is to be associated therewith. One terminal 7 of the section B is provided with a V-shaped notch 8, while its opposite terminal 9 is provided with a V-shaped tongue or extension 10. The terminal 7 is adapted to receive the terminal 11 of the section C and this terminal 11 is provided with a substantially V-shaped tongue or extension 12 which is adapted to fit in the notch 8. The V-shaped tongue or extension 10 formed on the terminal 9 of the section B is adapted to fit in a V-shaped notch or cut out portion 13 formed in the terminal 14 of the section C. The provision of these V-shaped notches and tongues at the terminals of the sections B and C provide means for permitting the tight interfitting of the sections and the preventing of lateral slipping of the sections in relation to one another. The terminals 7 and 11 of the sections B and C have the meeting faces of the tire flanges 5 and 6 cut at right angles to the body sections as indicated by the numeral 15.

The meeting terminals 9 and 14 of the sections B and C having the meeting faces of the flanges 5 and 6 cut diagonally as indicated by the numeral 16. The inner face of the body of the sections B and C have formed thereon the annular felly engaging flange 17 which is provided at equi-distantly spaced points with notches 18 for the fastening lugs (not shown) of a rim fastener. The meeting faces of the flange 17 are also cut diagonally as indicated by the numeral 19.

The meeting terminals 7 and 11 of the sections B and C are connected together by interfitting fasteners 20 which include a relatively large substantially U-shaped member 21 which is riveted or otherwise secured to the terminal 7. The legs of the U-shaped member 21 project beyond the notched face 8 of the terminal 7 and are adapted to engage the inner face of the terminal 11. The terminal 11 has secured thereto a relatively small U-shaped section 22 of the fastener 20 and this section is also riveted or otherwise secured to the terminal 11 in such a manner that its legs 11 will project beyond the V-shaped tongue or extension 12 for engagement with the under surface of the terminal 7. The section 22 of the fastener 20 is of sufficient width to fit between the legs of the U-shaped section 21 of the fastener and the abutting faces of the legs prevent relative lateral movement of the sections in relation to each other. The interfitting sections 21 and 22 of the fastener 20 permit the easy placing and connecting of the terminals 7 and 11 together and allows the flexing of the sections in relation to each other for connecting the other terminals 9 and 14 of the sections B and C together.

The terminals 9 and 14 of the sections B and C are connected together by a sliding fastener 25 which is slidably carried by a U-shaped strap 26 riveted or otherwise secured to the terminal 14 and this sliding fastener 25 is adapted to be moved into engagement with the inner face of the terminal 9. One end of the sliding fastener 25 is provided with a right angular extension or tongue 27, which forms the handle by means of which the fastener may be readily slid toward or away from the terminal 9. The end of the sliding fastener 25 remote from the handle 27 is provided with a substantially V-shaped notch 28 and the edges of this notch 28 are curved upwardly as at 29 for facilitating engagement of the fastener 25 with the terminal 9 for bringing the terminals 9 and 14 into alignment with each other.

In Figures 4 and 5 is illustrated a type of fastener 30 which can be utilized in lieu of the fastener 20 for connecting the terminals 7 and 11 together.

The interfitting fastener 30 includes a lug 31 and a lug 32. The lug 31 is riveted or otherwise secured to the terminal 11 at one side of the apex of the tongue 12 and is adapted to project forwardly therefrom for engagement with the under surface of the terminal 7. The lug 32 is riveted or otherwise secured to the terminal 7 at one side of the V-shaped notch 8 and extends forwardly therefrom and is adapted to engage the other terminal 11. The fastener 30 is similar to the fastener 20 and permits the easy and convenient interfitting of the terminals 7 and 11 and permits the same to flex so as to permit the easy placing of the terminals 9 and 14 into engagement with each other.

In operation of the improved rim when it is desired to place a tire thereon, the section B is first placed into engagement with the tire after which the section C is slid into position. The terminals 7 and 11 are first placed into engagement with each other with the parts 21 and 22 of the fastener 20 in correct relation to each other or the portions 31 and 32 of the fastener 30 after which the rim is spread in the ordinary manner until the terminals 9 and 14 come into their correct engagement with each other, after which the sliding fastener 25 is slid into position. It can be seen that if the terminals 9 and 14 are not exactly in alignment with each other the curved end 29 of the sliding fastener 25 will facilitate the correct positioning of these terminals in relation to each other.

In removing the tire from the rim, it is merely necessary to slide back the sliding plate 25 and break the rim connection at this point by dropping the tire and rim on the ground a little distance from the terminal 14 after which the section C is slid on the section B until the fasteners 20 and 30 have been detached after which the section C can be conveniently removed and the tire taken from the rim.

Changes in details, may be made without departing from the spirit or scope of this invention; but,

I claim:

1. A tire rim, comprising two sections, one formed in an arc in excess of a semi-circle, and the other formed in an arc correspondingly less than a semi-circle, the meeting terminals of said sections being formed with interfitting V-shaped notches preventing lateral displacement in either direction, rigid connecting devices at one of the meeting terminals of said sections permitting relative flexing of said sections, and a sliding fastener at the other meeting terminal movable longitudinally of the rim to interlock the terminals at that point.

2. In a split tire rim, a relatively large U-shaped member having its bight portion secured to the rim adjacent to the split portion and having its legs extending beyond its split portion, a second relatively small U-shaped member having its bight portion secured to the rim on the other side of the split portion and having its legs extending beyond the split portion for engagement with the legs of the other U-shaped member, the legs of the U-shaped members being adapted to engage the opposite meeting faces of the split portion.

3. A split tire rim comprising a U-shaped guide arranged adjacent to the split portion, a sliding fastener carried by the guide arranged to engage the rim on the other side of the split portion, the inner end of said sliding fastener being upturned to facilitate engagement of the fastener with the rim and to bring the portions of the rim in engagement.

PAUL SCHULTZE.